United States Patent
Thoreau et al.

(10) Patent No.: US 9,363,514 B2
(45) Date of Patent: Jun. 7, 2016

(54) SPATIAL PREDICTION TECHNIQUE FOR VIDEO CODING

(75) Inventors: Dominique Thoreau, Cesson Sevigne Cedex (FR); Aurelie Martin, Paris (FR); Edouard Francois, Bourg des Comptes (FR); Jerome Vieron, Paris (FR); Philippe Bordes, Cesson Sevigne Cedex (FR)

(73) Assignee: THOMSON LICENSING, Issy les Moulineaux (FR)

(*) Notice: Subject to any disclaimer, the term of this patent is extended or adjusted under 35 U.S.C. 154(b) by 695 days.

(21) Appl. No.: 13/575,105

(22) PCT Filed: Jan. 19, 2011

(86) PCT No.: PCT/EP2011/050693
§ 371 (c)(1),
(2), (4) Date: Oct. 15, 2012

(87) PCT Pub. No.: WO2011/089158
PCT Pub. Date: Jul. 28, 2011

(65) Prior Publication Data
US 2013/0195181 A1 Aug. 1, 2013

(30) Foreign Application Priority Data
Jan. 25, 2010 (FR) ...................................... 10 50466

(51) Int. Cl.
*H04N 7/26* (2006.01)
*H04N 19/593* (2014.01)
(Continued)

(52) U.S. Cl.
CPC ... *H04N 19/00763* (2013.01); *H04N 19/00696* (2013.01); *H04N 19/105* (2014.11);
(Continued)

(58) Field of Classification Search
CPC ............................................... H04N 19/00763
USPC ...................................................... 375/240.12
See application file for complete search history.

(56) References Cited

U.S. PATENT DOCUMENTS 6,680,974 B1 * 1/2004 Faryar et al. ............. 375/240.18
8,446,949 B2 * 5/2013 Byeung Woo et al. .... 375/240.1
(Continued)

FOREIGN PATENT DOCUMENTS

EP 873015 10/1998
EP 2056606 5/2009
(Continued)

OTHER PUBLICATIONS

Guleryuz, "Nonlinear Approximation Based Image Recovery Using Adaptive Sparse Reconstructions and Iterated Denoising—Part I: Theory," IEEE Transactions on Image Processing, US. vol. 15, No. 3, Mar. 2006, pp. 539-554.
(Continued)

*Primary Examiner* — William C Vaughn, Jr.
*Assistant Examiner* — Luis Perez Fuentes
(74) *Attorney, Agent, or Firm* — Tutunijian & Bitetto, P.C.

(57) ABSTRACT

A method for coding a block of pixels is disclosed. The method comprises the following steps:
  determining, for each pixel of the current block, a prediction pixel by thresholding, with a current threshold value, of coefficients resulting from a transformation applied on a window covering at least the pixel of the current block and by inverse transformation applied to the thresholded coefficients,
  extracting from the current block a prediction block formed of prediction pixels to generate a residue block, and
  coding said residue block,
According to the invention, the current threshold value is determined or coded from neighboring reconstructed pixels of the current block.

12 Claims, 6 Drawing Sheets

Figure 3:
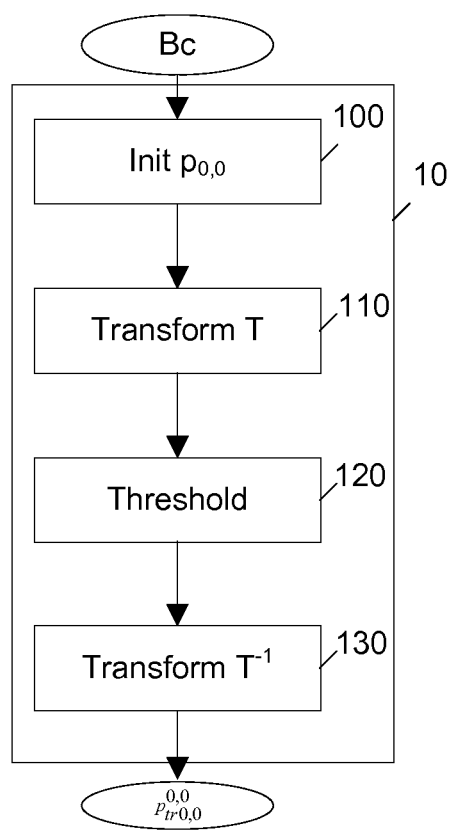

(51) Int. Cl.

| | |
|---|---|
| *H04N 19/105* | (2014.01) |
| *H04N 19/176* | (2014.01) |
| *H04N 19/51* | (2014.01) |
| *H04N 19/50* | (2014.01) |
| *H04N 19/61* | (2014.01) |
| *H04N 19/192* | (2014.01) |
| *H04N 19/48* | (2014.01) |
| *H04N 19/52* | (2014.01) |

(52) U.S. Cl.
CPC ........... *H04N19/176* (2014.11); *H04N 19/192* (2014.11); *H04N 19/48* (2014.11); *H04N 19/50* (2014.11); *H04N 19/52* (2014.11); *H04N 19/593* (2014.11); *H04N 19/61* (2014.11)

(56) References Cited

U.S. PATENT DOCUMENTS

| | | | | |
|---|---|---|---|---|
| 8,542,736 | B2 * | 9/2013 | Har-Noy et al. | 375/240.12 |
| 8,670,488 | B2 * | 3/2014 | Andersson et al. | 375/240.29 |
| 8,699,562 | B2 * | 4/2014 | Park et al. | 375/240 |
| 8,818,114 | B2 * | 8/2014 | Kim et al. | 382/232 |
| 2009/0238276 | A1 | 9/2009 | Har-Noy et al. | |
| 2011/0090969 | A1 * | 4/2011 | Sung et al. | 375/240.25 |
| 2013/0101040 | A1 * | 4/2013 | Francois et al. | 375/240.16 |
| 2013/0195181 | A1 * | 8/2013 | Thoreau et al. | 375/240.12 |

FOREIGN PATENT DOCUMENTS

| | | |
|---|---|---|
| JP | 2009081489 | 4/2009 |
| WO | WO9819461 | 5/1998 |
| WO | WO2008012918 | 1/2008 |
| WO | WO2008048489 | 4/2008 |

OTHER PUBLICATIONS

Guleryuz, "Nonlinear Approximation Based Image Recovery Using Adaptive Sparse Reconstructions and iterated Denoising—Part II: Adaptive Algorithms," IEEE Transactions on Image Processing, US, vol. 15, No. 3, Mar. 2006, pp. 555-571.

Martin et al., "Atomic decomposition dedicated to AVC and spatial SVC prediction," Proceedings of the 15th International Conference on Image Processing (ICIP 2008). IEEE, US, Oct. 12, 2008, pp. 2492-2495.

Martin et al., "Phase refinement for image prediction based on sparse representation," Proceedings of the SPIE Bellingham. VA, US, vol. 7543, Jan. 19, 2010, pp. 1-8.

Search Report Dated Jul. 1, 2011.

Ichigaya et al., "Description of Video Coding Technology Proposal by NHK and Mitsubishi", Joint Collaborative Team on Video Coding of ITU-T SG16 WP3 and ISO/IEC JTC1/SC29/WG11, 1st Meeting, Dresden, Germany, Apr. 15, 2010, pp. 1-17.

Kim et al., "Description of Video Coding Technology Proposal by Etr", Jloint Collaborative Team on Video Coding of Itu-T SG16 WP3 and Iso/Iec JTC1/SC29/WG11, 1st Meeting, Dresden, Germany, 15 Apr. 2010, pp. 1-10.

Thoreau et al., "Sparse Shift-DCT Spatial Prediction", Proceedings of 2010 IEEE 17th International Conference on Image Processing, Hong Kong, China, Sep. 26, 2010, pp. 3385-3388.

Wiegand et al., "Overview of the H.264/AVC Video Coding Standard", IEEE Transactions on Circuits and Systems for Video Technology, July 2003, vol. 13, No. 7, pp. 560-576.

Ye et al., "Improved H.264 Intra Coding Based on Bi-Directional Intra Prediction, Directional Transform, and Adaptive Coefficient Scanning", 2008 International Conference on Image Processing, San Diego, California, USA, Oct. 12, 2008, pp. 2116-2119.

Tan et Al., "Intra Prediction by Template Matching", 2006 International Conference on Image Processing, Atlanta, Georgia, USA, Oct. 8, 2006, pp. 1693-1696.

Turkan et al., "Sparse approximation with adaptive dictionary for image prediction", 2009 International Conference on Image Processing, Cairo, Egypt, Nov. 7, 2009, pp. 25-28.

Hua et al., "Spatial Sparsity Induced Temporal Prediction for Hybrid Video Compression", Proceedings of 2007 Data Compression Conference, Snowbird, Utah, USA, Jan. 10, 2007, pp. 1-10.

Xu et al., "Sparsity-based deartifacting filtering in video compression", 2009 International Conference on Image Processing, Cairo, Egypt, Nov. 7, 2009, pp. 3933-3936.

Suhring, "KTA Software", Fraunhofer Heinrich Hertz Institute (HHI), http://iphome.hhi.de/suehring/tml/download/KTA/, Jan. 6, 2011, pp. 1.

Wang et al., "Video Quality Assessment Based on Structural Distortion Measurement", Signal Processing: Image Communication, vol. 19, No. 1, Jan. 2004, pp. 1-9.

Bjontegaad, "Calculation of average PSNR differences between RD curves", Document VCEG-M33, ITU-T VCEG Meeting, Study Group 16, Austin, Texas, USA, Apr. 2, 2001, pp. 1-4.

Wiegand et al., "Draft ITU-T Recommendation and Final Draft International Standard of Joint Video Specification (ITU-T Rec. H.264 ISO/IEC 14496-10 AVC)", Joint Video Team (JVT) of ISO/IEC MPEG & ITU-T VCEG (ISO/IEC JTC1/SC29/WG11 and ITU-T SG16 Q.6), 7th Meeting, Pattaya, Thailand, Mar. 7, 2003, pp. 1-264.

\* cited by examiner

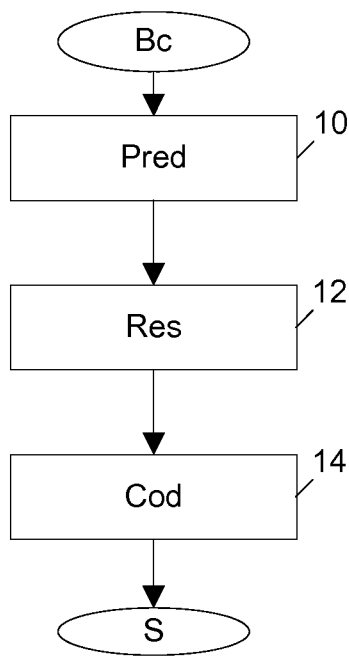
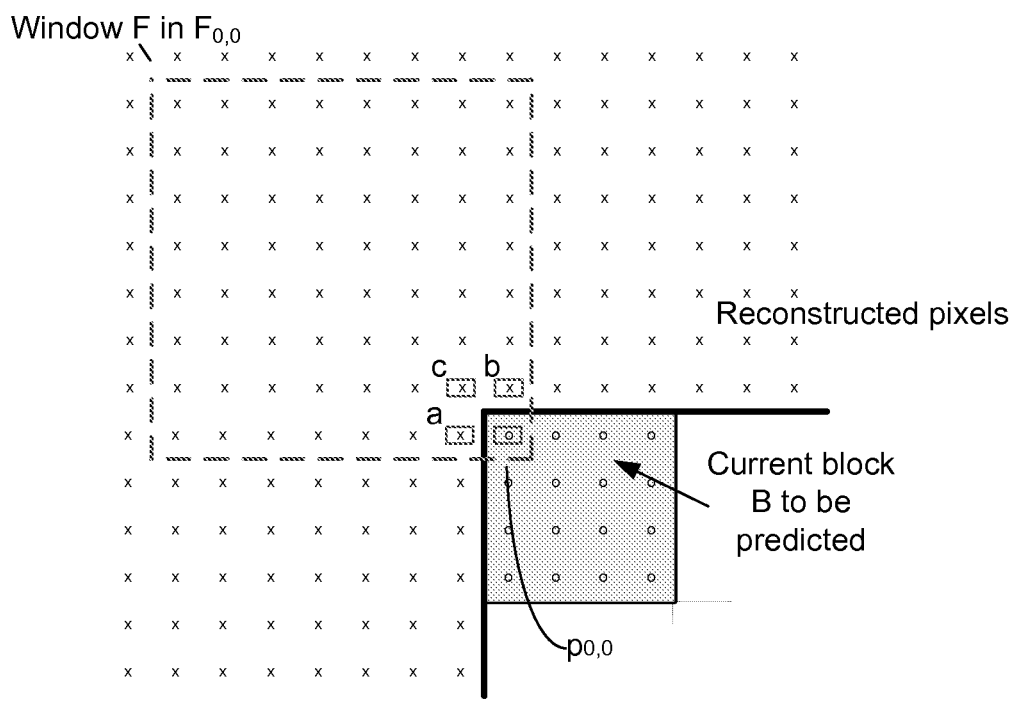
FIGURE 1
FIGURE 2

SPATIAL PREDICTION TECHNIQUE FOR VIDEO CODING

This application claims the benefit, under 35 U.S.C. §365 of International Application PCT/EP2011/050693, filed Jan. 19, 2011, which was published in accordance with PCT Article 21(2) on Jul. 28, 2011 in English and which claims the benefit of French patent application No. 1050466, filed Jan. 25, 2010.

1. SCOPE OF THE INVENTION

The invention relates to the general domain of image coding.

The invention relates more specifically to a method for coding and a method for decoding a block of an image.

2. PRIOR ART

It is known in the art to code an image of a sequence of images to divide this image into blocks of pixels and to code each of the blocks by spatial prediction (INTRA mode) or temporal prediction (INTER mode). The coding of the current block generally comprises the transformation into a block of coefficients, for example by a DCT (Discrete Cosine Transform), of the difference between the pixels of the current block and the pixels of the prediction block. The coding further comprises the quantization of coefficients, then the entropy coding of quantized coefficients.

It is known in the art to code the current block in INTRA mode, i.e. by spatial prediction, to predict the current block from image data of spatially neighbouring blocks previously coded. For example, it is known in the H.264 video coding standard to predict a current block from pixels situated above the current block or on the left of the current block. More specifically, the pixels of the current block are predicted by a linear combination of pixels neighbouring the current block according to a preferred prediction direction (for example horizontal, vertical, etc.) The prediction pixels, i.e. resulting from a linear combination of neighbouring pixels of the current block, form a prediction block. This prediction method is particularly efficient when the current block to be predicted comprises contours. In fact, if the edge of an object corresponds to one of the prediction directions defined by the H.264 standard, the contour is in fact propagated in a mono-directional way in the current block to be predicted. However, when there are two dimensional structures this method of prediction loses its efficiency.

3. SUMMARY OF THE INVENTION

The purpose of the invention is to overcome at least one of the disadvantages of the prior art. For this purpose, the invention relates to a method for coding a block of pixels, called the current block, by spatial prediction. The coding method according to the invention comprises the following steps for:

determining, for each pixel of the current block, a prediction pixel by thresholding, with a current threshold value, of coefficients resulting from a transformation applied on a window covering at least the pixel of the current block and by inverse transformation applied to the thresholded coefficients, extracting from the current block a prediction block formed of prediction pixels to generate a residue block, and
coding the residue block.
Advantageously, the current threshold value is determined or coded from neighbouring reconstructed pixels of the current block. In determining or in coding the current threshold value from neighbouring reconstructed pixels of the current block, the coding efficiency is improved.

According to a particular embodiment, the step of determination, for each pixel of the current block, of a prediction pixel is reiterated with each threshold value of a plurality of threshold values. The method also comprises the selection as current threshold value, from among the plurality of threshold values, of the threshold value for which a prediction error calculated between the current block and the prediction block is smallest.

According to a particular aspect of the invention, the current threshold value is coded by difference with a prediction threshold value, which prediction value depends on neighbouring reconstructed pixels of the current block.

According to a particular characteristic, the prediction threshold value is equal to the average of threshold values used in the neighbouring blocks of the current block.

According to a first variant, the prediction threshold value is equal to the median value of threshold values used in the neighbouring blocks of the current block.

According to a second variant, the prediction threshold value is determined according to the following steps for:

determining, for each reconstructed pixel in a neighbouring area of the current block, a prediction pixel by thresholding, with a threshold value, of coefficients resulting from a transformation applied on a window covering at least the reconstructed pixel and by inverse transformation applied to the thresholded coefficients, reiterating, with each threshold value of a plurality of threshold values, the step of determination of a prediction pixel for each pixel of the neighbouring area, selecting as prediction threshold value, from among the plurality of threshold values, the threshold value for which a prediction error calculated between the reconstructed pixels of the neighbouring area of the current block and the corresponding prediction pixels is smallest.

According to another embodiment, the current threshold value is determined according to the following steps for:

determining, for each reconstructed pixel in a neighbouring area of the current block, a prediction pixel by thresholding, with a threshold value, of coefficients resulting from a transformation applied on a window covering at least the reconstructed pixel and by inverse transformation applied to the thresholded coefficients, reiterating, with each threshold value of a plurality of threshold values, the step of determination of a prediction pixel for each pixel of the neighbouring area, selecting as current threshold value, from among the plurality of threshold values, the threshold value for which a prediction error calculated between the reconstructed pixels of the neighbouring area of the current block and the corresponding prediction pixels is smallest.

Advantageously, the prediction error calculated between the reconstructed pixels of the neighbouring area of the current block and the corresponding prediction pixels takes into account, for each of the reconstructed pixels of the neighbouring area of the current block their distance with respect to the edge of the current block.

According to another aspect of the invention, the current threshold value being selected for a current block of size 8×8, a current threshold value is calculated for each of the blocks of size 4×4 of the current block by multiplication of the current threshold value selected by a coefficient α strictly less than 1.

Advantageously, the size of the window depends on the position in the current block of the pixel to be predicted.

The invention also relates to a method for decoding a current block of pixels by spatial prediction comprising the following steps for:

decoding a residue block, determining, for each pixel of the current block, a prediction pixel by thresholding, with a current threshold value, of coefficients resulting from a transformation applied on a window covering at least the pixel of the current block and by inverse transformation applied to the thresholded coefficients, and reconstructing said current block by merging the decoded residue block and the prediction block formed of prediction pixels.

Advantageously, the current threshold value is determined from neighbouring reconstructed pixels of the current block.

According to a particular embodiment, the current threshold value is determined according to the following steps for:

determining, for each reconstructed pixel in a neighbouring area of the current block, a prediction pixel by thresholding, with a threshold value, of coefficients resulting from a transformation applied on a window covering at least the reconstructed pixel and by inverse transformation applied to the thresholded coefficients, reiterating with each threshold value of a plurality of threshold values, the step of determination of a prediction pixel for each pixel of the neighbouring area, selecting as current threshold value, from among the plurality of threshold values, the threshold value for which a prediction error calculated between the reconstructed pixels of the neighbouring area of the current block and the corresponding prediction pixels is smallest.

According to another particular embodiment, the method for decoding according to the invention also comprises the following steps for:

decoding a difference of threshold values, determining a prediction threshold value from neighbouring reconstructed pixels of the current block, and calculating the sum of the difference and the prediction threshold value, the sum being the current threshold value.

Advantageously, the prediction threshold value is determined according to the following steps for:

determining, for each reconstructed pixel of a neighbouring area of the current block, a prediction pixel by thresholding, with a threshold value, of coefficients resulting from a transformation applied on a window covering at least the reconstructed pixel and by inverse transformation applied to the thresholded coefficients, reiterating with each threshold value of a plurality of threshold values, the step of determination of a prediction pixel for each pixel of the neighbouring area, and selecting as prediction threshold value, from among the plurality of threshold values, the threshold value for which a prediction error calculated between the reconstructed pixels of the neighbouring area of the current block and the corresponding prediction pixels is smallest.

4. LIST OF FIGURES

Figure 4:
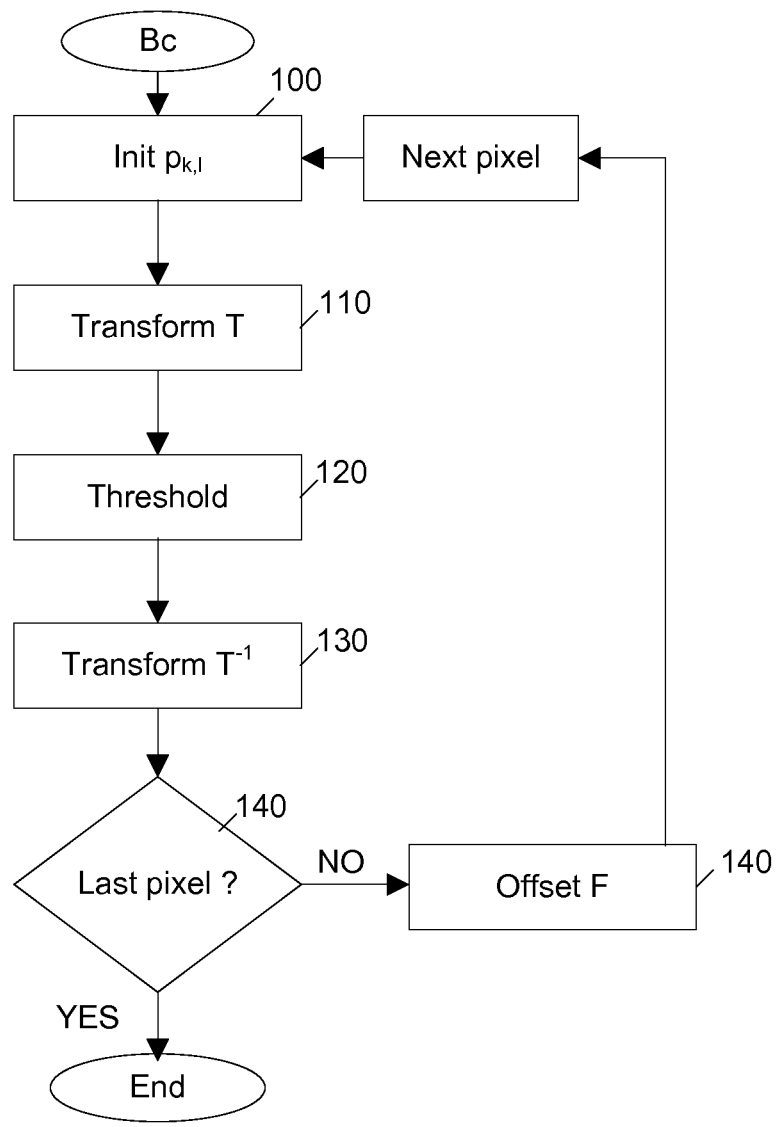
Figure 5:
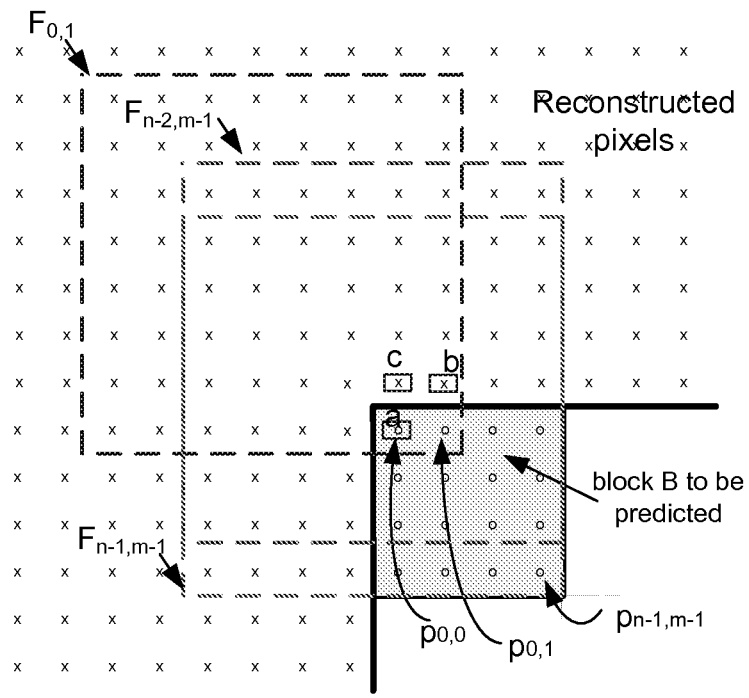
Figure 6:
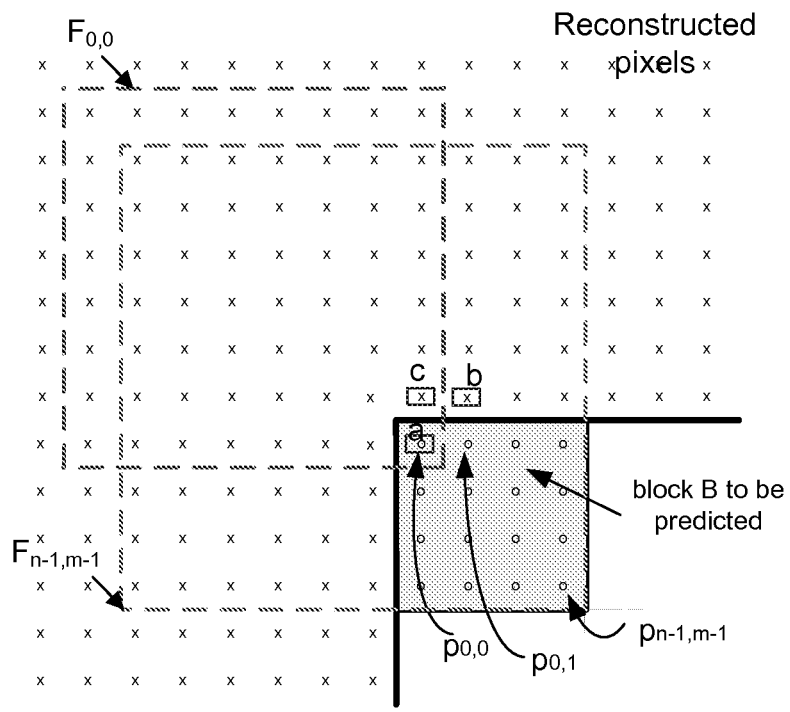
Figure 7:
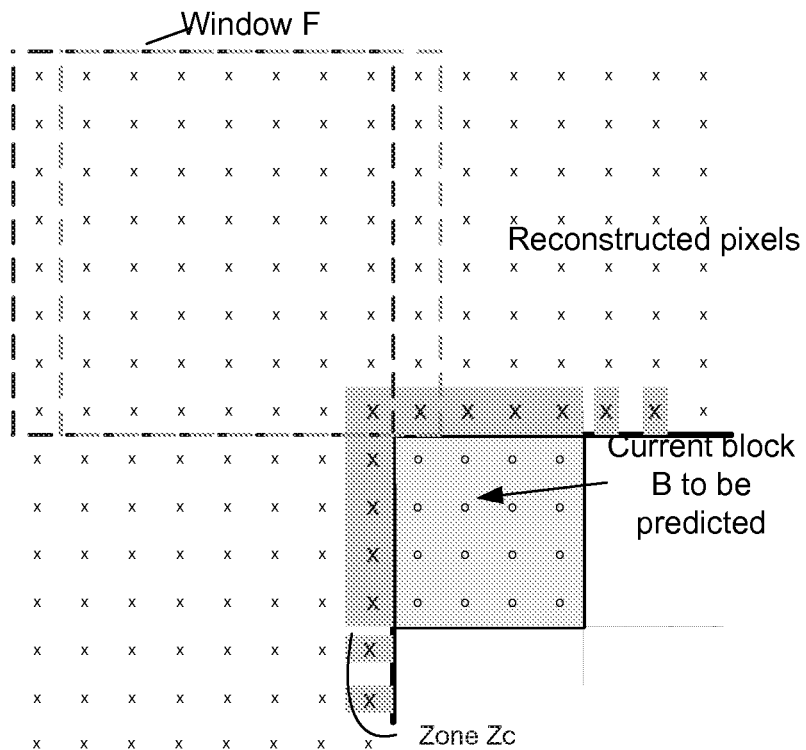
Figure 8:
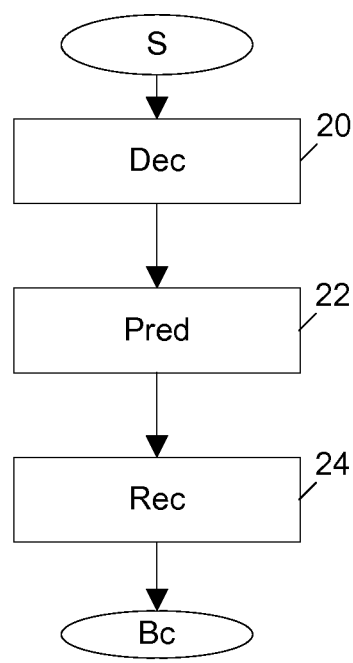
Figure 9:
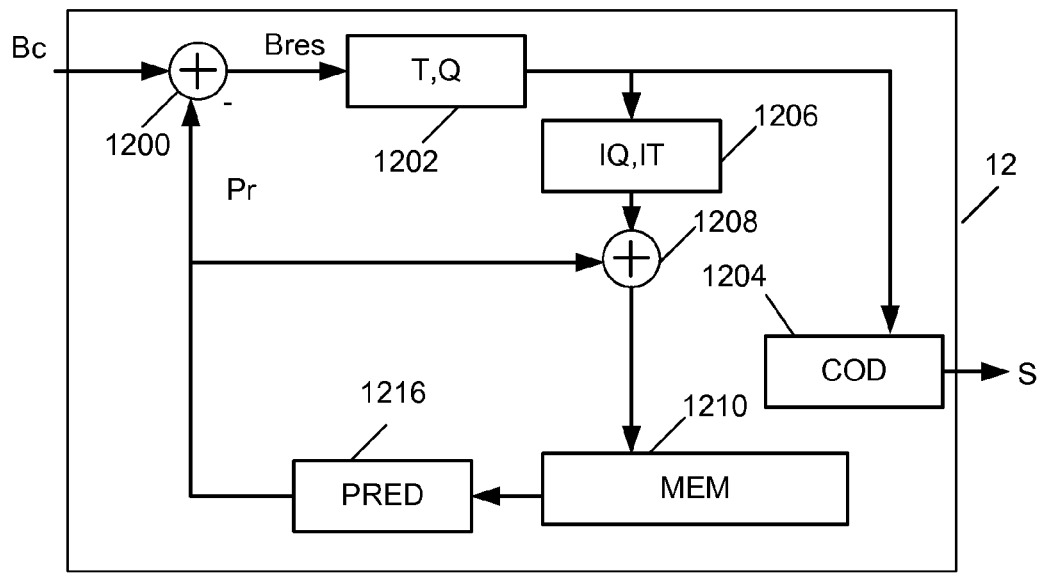
Figure 10:
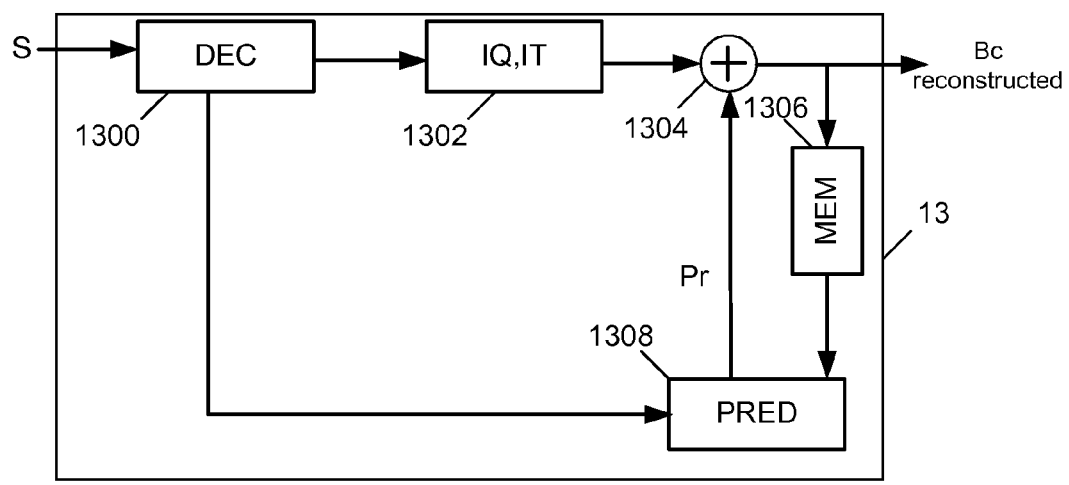

The invention will be better understood and illustrated by means of embodiments and advantageous implementations, by no means limiting, with reference to the figures in the appendix, wherein:

FIG. 1 shows a coding method according to the invention,

FIG. 2 shows an image part comprising a block to be predicted and a window used for the prediction of this block, FIGS. 3 and 4 show in detail a step of the coding method according to the invention, FIGS. 5 and 6 show an image part comprising a block to be predicted and different windows used for the prediction of this block, FIG. 7 shows an image part comprising a block to be predicted, a causal zone Zc neighbouring this block and a window used for the prediction of pixels of this causal zone, FIG. 8 shows a decoding method according to the invention, FIG. 9 illustrates a coding device according to the invention, and FIG. 10 shows a decoding device according to the invention.

5. DETAILED DESCRIPTION OF THE INVENTION

An image comprises pixels or image points with each of which is associated at least one item of image data. An item of image data is for example an item of luminance data or an item of chrominance data.

The term "residue" designates the data obtained after extraction of other data. The extraction is generally a subtraction of prediction pixels from source pixels. However, the extraction is more general and comprises notably a weighted subtraction.

The term "reconstructs" designates data (for example pixels, blocks) obtained after merging of residues with prediction data. The merge is generally a sum of residue prediction pixels. However, the merging is more general and comprises notably the weighted sum. A reconstructed block is a block of reconstructed pixels.

In reference to image decoding, the terms "reconstruction" and "decoding" are very often used as being synonymous. Thus, a "reconstructed block" is also designated under the terminology of "decoded block".

The invention relates to a method for coding a block of pixels, called the current block, by spatial prediction. It applies to the coding of an image or to image sequences. The method for coding according to the invention is based on a method for extrapolation of a signal described in the document by Guleryuz, O. G. entitled "Nonlinear approximation based image recovery using adaptive sparse reconstructions and iterated denoising", Image Processing, IEEE Transactions on Volume 15, Issue 3, March 2006 Page(s): 539-571. Originally this method of extrapolation was used for the purpose of masking errors.

The method for coding a current block of an image according to the invention is described in reference to FIG. 1.

During a step 10, a prediction pixel is determined for each pixel of a current block. The prediction pixels form a prediction block of the current block. The prediction pixels are obtained by a thresholding, with a current threshold value, of coefficients from a transformation applied on a window covering at least the pixel of the current block to be predicted. The window corresponds to the support of the transform. The transform used is for example a DCT. However, the invention is not limited to this latter. Other transforms such as the Discrete Fourier Transform can be applied. According to the invention, the current threshold value is determined or coded from neighbouring reconstructed pixels of the current block. In determining or in coding the current threshold value from neighbouring reconstructed pixels of the current block, the coding efficiency is improved.

During a step 12, the prediction block formed from prediction pixels is extracted from the current block to generate a residue block.

During a step 14, the residue block is coded in a stream S. For example, the residue block is transformed, for example by a DCT or a wavelet transform into a block of coefficients that are quantized then coded by entropy coding. According to a variant, the residue block is only quantized then coded by entropy coding.

Step 10 of determination of prediction pixels is described more precisely in references to FIGS. 2 and 3. In FIG. 2, the prediction pixel $p_{0,0}$ corresponding to the pixel on the top left of the current block B to be predicted. The pixels identified in FIG. 2 by crosses are known pixels, i.e. reconstructs. The pixel $p_{0,0}$ is predicted in order to give it a value representative of its environment. The window F, in its initial position $F_{0,0}$, covers at least the pixel $p_{0,0}$ to be predicted. It is on this window that is applied a transformation in step 10.

During a step 100, an initial value is assigned to the pixel $p_{0,0}$. As a simple example, the average value from the neighbouring pixels is assigned to the pixel $p_{0,0}$. This value is noted as $p_{av0,0}$: $p_{av0,0}=(a+b+c)/3$. According to a variant, the median value of pixels a, b and c is assigned to the pixel $p_{0,0}$. According to another variant, one of the values a, b or c is assigned to the pixel $p_{0,0}$. According to other variants, other pixels situated in the causal neighbouring area of the pixel $p_{0,0}$ are taken into account to determine an initial value for the pixel $p_{0,0}$. The causal neighbouring area of a current pixel comprises the set of pixels of the current image already reconstructed during the coding (respectively the decoding) of the current pixel.

During a step 110, a transformation is applied to the pixels of window F. These pixels are then transformed into coefficients.

During a step 120, the coefficients are thresholded in the domain transformed using a threshold value $th_{opt}$. This thresholding has the effect of eliminating the noise to retain only the significant coefficients.

During a step 130, an inverse transform to that applied in step 120 is applied to return into the pixel domain so as to recover a new prediction pixel value noted as $p_{tr0,0}^{0,0}$, the indexes greater than $p_{tr0,0}^{0,0}$ of null values correspond to a null offset of the window F in line and column with respect to the initial position of the window.

In reference to FIGS. 4 and 5, the same method as that described in reference to FIG. 3 is applied with a window F offset to determine prediction pixels for the other pixels of the current block B. The pixels $p_{0,0}$ to $p_{n-1,m-1}$ are predicted iteratively. With respect to the position $F_{0,0}$ of the window F in FIG. 3, the window is offset by 1 pixel to the right for the determination of the prediction pixel $p_{0,1}$ corresponding to the pixel of the current block just to the right of the pixel $p_{0,0}$. In FIG. 5, a, b and c are neighbouring reconstructed pixels of the pixel $p_{0,1}$ situated respectively to the left, above and on the diagonal of the pixel to be predicted $p_{0,1}$ where a is more specifically, in the present case, equal to the value of the pixel $p_{tr0,0}^{0,0}$ interpolated previously.

According to a variant the window in position $F_{0,0}$ is offset by 2 pixels to the right, i.e. into the position $F_{0,2}$. In this case, in the second iteration, the pixel $p_{0,1}$ and the pixel $p_{0,2}$ are predicted. More generally, the window F can be offset by m pixels in m pixels. In order that the prediction is not too degraded, it is advantageous that the value of m remains small.

During step 100, the average value from the neighbouring pixels is assigned to $p_{0,1}$. For example, the value $(p_{tr0,0}^{0,0}+b+c)/3$. This value is noted as $p_{av0,1}^{0,1}$. The variants described in step 100 in reference to the pixel $p_{0,0}$ can also apply.

During a step 110, a transformation is applied to the pixels of window $F_{0,1}$. These pixels are then transformed into coefficients.

During a step 120, the coefficients are thresholded in the domain transformed with the threshold value $th_{opt}$. This thresholding has the effect of eliminating the noise to retain only the significant coefficients.

During a step 130, an inverse transform to that applied in step 110 is applied to return into the pixel domain so as to recover a new prediction pixel value noted as $p_{tr0,1}^{0,1}$, the indexes greater than $p_{tr0,1}^{0,1}$ correspond to an offset of the window F of 0 in lines and 1 in columns. As shown in FIG. 5, le pixel $p_{0,0}$ is comprised in the window in position $F_{0,1}$. Thus during the calculation of the prediction pixel $p_{0,1}$ a new value is also calculated for the pixel $p_{0,0}$. In fact, during the inverse transformation, a value $p_{tr.0,0}^{0,1}$ is assigned to the pixel $p_{0,0}$. This value $p_{tr.0,0}^{0,1}$ can be different to that $p_{tr.0,0}^{0,0}$ calculated in the preceding iteration (with the window in $F_{0,0}$), when the window F was not offset. In order to take into account the two values calculated for the pixel $p_{0,0}$, i.e. that $p_{tr.0,0}^{0,0}$ obtained in the preceding iteration for a null offset of the window F and that $p_{tr.0,0}^{0,1}$ obtained in the current iteration for an offset of 0 in lines and of 1 in columns, a new value is assigned to the prediction pixel $p_{0,0}$. This new value noted as $p_{Int.0,0}^{0,1}$ is for example equal to the average of two values $p_{tr.0,0}^{0,0}$ and $p_{tr.0,0}^{0,1}$, i.e. $p_{Int.0,0}^{0,1}=(p_{tr.0,0}^{0,0}+p_{tr.0,0}^{0,1})/2$ The method is reiterated until all the pixels of the block B are predicted. For this purpose, during a step 140 it is verified if the current pixel is the last of the block to be predicted. If this is the case then the step of determination of the prediction block is terminated. In the contrary case, the window F is offset by one column to the right if there are still remaining pixels to be predicted in the current line or to the line below so as to again place the window at the start of the line. However, the way in which the window F is offset at each iteration is not fixed. It depends on the scanning order defined for the block to be predicted. In reference to the preceding figures, the scanning of pixels is carried out pixel by pixel from left to right then line by line. This scanning is not exclusive, a zigzag type scanning is possible as well as other types, such as for example a scanning of the first line then of the first column, then of the second line then the second column and so on.

The steps 100 to 140 are again applied with the new position of the window. A value $p_{tr.sk,sl}^{sk,sl}$ is determined for the new pixel $p_{sk,sl}$ to be predicted. A new prediction value is also calculated for the pixels of the current block comprised in the window F for which a prediction value or prediction values is/are already calculated during the preceding iterations. For these pixels a new prediction value is determined as described above in reference to the pixel $p_{0,0}$ in the following way:

$$p_{Int.k,l}^{sk,sl} = \sum_{p=k}^{sk} \sum_{q=l}^{sl} (p_{tr.k,l}^{p,q})/((sk-k+1)(sl-l+1))$$

Where:

$p_{tr.k,l}^{sk,sl}$ is the pixel predicted in line k and column l of the block to be predicted during the iteration corresponding to the position $F_{sk,sl}$ of the window F, sk and sl: the offsets respectively in line and column of the window F, $p_{Int.k,l}^{sk,sl}$ is the value of the prediction pixel in position (k, l) recursively predicted by successive offsets of the window F up to the position $F_{sk,sl}$. According to a variant, the weighted sum is replaced by the median function $$p_{Int,k,l}^{sk,sl} = \underset{\substack{p=k..sk \\ q=l..sl}}{\text{Median}}(p_{tr,k,l}^{p,q})$$

or a histogram peak type function.

According to a first embodiment, the threshold value $th_{opt}$ is determined from a causal zone Zc, i.e. comprising reconstructed pixels in a neighbouring area of the current block B, not necessarily adjacent to this block. This embodiment is described in reference to FIG. 7. On this FIG. 7, the crosses designate reconstructed pixels. The crosses on a grey background designate pixels that belong to the causal zone Zc. This zone Zc is used to determine a threshold value for the current block to be predicted. For this purpose, the method described in reference to FIGS. 4 and 5, is applied to the pixels of this zone Zc in order to determine for each among them a prediction pixel and this for several threshold values $th_i$. Thus for each of the threshold values $th_i$, an energy level is calculated on the zone Zc. As a simple illustration, this energy will be calculated according to the following formula:

$$SSE_i = \sum_{p \in ZC} (Y(p) - p_{Int.}(p))^2$$

where
p represents the position of a pixel contained in the block,
Y is the value of an item of image data (for example luminance and/or chrominance) of the pixel in the current block to be predicted,
$p_{Int.}$ is the prediction value determined for a threshold value $th_i$.

A threshold value $th_{zc}$ is determined for the zone Zc as being that generating the minimal prediction energy $SSE_i$
According to a variant the energy is calculated as follows:

$$SAD_i = \sum_{p \in Bloc\_NxM} |Y(p) - p_{Int.}(p)|$$

According to another variant, the energy is calculated as follows:

$$E_i = \underset{p \in Bloc\_NxM}{\text{Max}} |Y(p) - p_{Int.}(p)|$$

According to another variant, a weighting function is introduced that enables the prediction error of pixels of Zc to be relativized according to the distance of pixels of Zc with respect to the frontier of the block to be predicted. The values of this weighting function will thus vary, for example, according to the distance of pixels relative to the centre of the block to be predicted such that:

$$w_{8 \times 8}(i, j) = c \times \rho^{\sqrt{(i-11.5)^2 + (j-11.5)^2}}$$

$$w_{4 \times 4}(i, j) = c \times \rho^{2 \times \sqrt{(i-5.5)^2 + (j-5.5)^2}}$$

where:
c standardisation coefficient,
$\rho = 0.8$, i and j correspond to the coordinates of weighting coefficients in the frame of the weighting window, where the centre of the block to be predicted is in (5.5, 5.5) and (11.5, 11.5) respectively for blocks of dimensions in 4×4 and 8×8,
the origin (0, 0) being in the top left.

The threshold value $th_{opt}$ for the current block to be predicted is equal to $th_{zc}$. The zone Zc can have different forms according particularly to the availability of neighbouring pixels. Likewise the thickness of the zone can go beyond 1 pixel.

According to a second embodiment, the threshold value $th_{opt}$ is determined for a current block by reiterating the method described in reference to FIGS. 4 and 5 with different threshold values $th_i$ and by determining the threshold value for which a prediction error calculated between the prediction block and the current block is smallest.

Thus for each threshold value $th_i$, an energy level is calculated. As a simple example, this energy will be calculated according to the following formula:

$$SSE_i = \sum_{p \in Bloc\_NxM} (Y(p) - p_{Int.}(p))^2$$

where
p represents the position of a pixel contained in the block,
Y is the value of an item of image data (for example luminance and/or chrominance) of the pixel in the current block to be predicted,
$p_{Int}$ is the prediction value determined for a threshold value $th_i$.

The threshold value $th_{opt}$ is that generating the minimal prediction energy $SSE_i$ According to a variant the energy is calculated as follows:

$$SAD_i = \sum_{p \in Bloc\_NxM} |Y(p) - p_{Int.}(p)|$$

According to another variant, the energy is calculated as follows:

$$E_i = \underset{p \in Bloc\_NxM}{\text{Max}} |Y(p) - p_{Int.}(p)|$$

The value of the current threshold $th_{opt}$ determined according to this second embodiment is either coded directly in the stream S or advantageously is coded in the stream S by difference with a prediction threshold value $th_{pred}$ in order to reduce its coding cost.

For example, the prediction threshold value $th_{pred}$ is equal to the average of threshold values $th_{opt}$ determined for blocks neighbouring the current block and that have already been coded. The block to the left, the block above and the top left block are taken into account. According to a variant, the top right block is also taken into account.

According to another variant, the prediction threshold value $th_{pred}$ is equal to the median of threshold values $th_{opt}$ determined for blocks neighbouring the current block and that have already been coded.

According to yet another variant, the prediction threshold value $th_{pred}$ equal to $th_{zc}$. It should be noted that if $th_{opt}$ is determined according to the first embodiment then $th_{opt} = th_{zc}$ in which case, the threshold value is not coded as it can be determined on the decoder side from pixels of Zc in the same way as it was on the coder side.

According to a particular embodiment a current block of size 8×8 can be predicted by determining a current threshold value for the 8×8 block and by applying the method described in reference to the FIGS. 4 and 5 with a current threshold value noted as th8×8 or by dividing this 8×8 block into four 4×4 blocks and applying the method described in reference to FIGS. 4 and 5 independently on each 4×4 block with the same current threshold value for each block noted as th4×4, which is deduced from th8×8 according to the following equation: th4×4=α*th8×8, with a strictly less than 1.

The invention also relates to a method for decoding described in reference to FIG. 8.

During a step 20, a residue block is decoded for the current block. For example, a part of the stream S is decoded into coefficients. The coefficients are dequantized then if necessary transformed by an inverse transform to that used on the coder side. The residue block is thus obtained.

During a step 22, a prediction pixel is determined for each pixel of a current block. The prediction pixels form a prediction block of the current block. The prediction pixels are obtained by a thresholding, with a current threshold value, of coefficients from a transformation applied on a window covering at least the pixel of the current block to be predicted. The window corresponds to the support of the transform. The transform used is for example a DCT.

However, the invention is not limited to this latter. Other transforms such as the Discrete Fourier Transform can be applied.

During a step 24, the current block is reconstructed by merging the prediction block with the decoded residue block.

The step 22 of determination of prediction pixels is identical to step 10 of the coding method. However on the decoder side the threshold value $th_{opt}$ is either decoded from the stream S in the case where it was coded in this same stream on the coder side, or it is determined directly from reconstructed pixels in a neighbouring area of the current block.

According to a first embodiment, $th_{opt}$ is decoded from the stream either directly or by addition of the decoded value to a prediction value $th_{pred}$ in the case of a coding differential of this value. For example, the prediction threshold value $th_{pred}$ is equal to the average of threshold values $th_{opt}$ determined for blocks neighbouring the current block and that have already been coded. For example, the block to the left, the block above and the top left block are taken into account. According to a variant, the top right block is also taken into account.

According to another variant, the prediction threshold value $th_{pred}$ is equal to the median of threshold values $th_{opt}$ determined for blocks neighbouring the current block and that have already been coded.

According to another variant, the prediction threshold value $th_{pred}$ is equal to $th_{zc}$, where $th_{zc}$ is determined as described on the coder side in reference to FIG. 7.

According to a second embodiment, the threshold value $th_{opt}$ is directly determined from reconstructed pixels in the zone Zc in the same way as described on the coder side in reference to FIG. 7. In this case $th_{opt}$ is equal to $th_{zc}$.

According to a particular embodiment that can be applied to the coding and decoding methods, the size of the window F depends on the position in the current block of the pixel to be predicted as shown in FIG. 6. In this figure the window in position $F_{0,0}$ is of a smaller size than the window in position $F_{n-1,m-1}$. This has the advantage of improving the relevance of the prediction block. For example, when the current block is of size 4×4, the size of the window is 4×4 for the pixels situated on the edges on top and on the left of the current block, i.e. first lines and first columns and the window is of size 8×8 for the other pixels of the current block. The dimensions of the window or windows used are not limited to powers of 2. In fact, the invention is not limited to the use of transformations known as "rapid" transformations which apply to a number of multiple samples of $2^N$. In addition, the transformation used is not necessarily be separated.

The invention also relates to a coding device 12 described in reference to FIG. 9 and a decoding device 13 described in reference to FIG. 10. In FIGS. 9 and 10, the modules shown are functional units, that may correspond or not to physically distinguishable units. For example, these modules or some of them can be grouped together in a single component, or constitute functions of the same software. Conversely, some modules may be composed of separate physical entities.

In reference to FIG. 9, the coding device 12 receives at input an image or images. The coding device 12 is able to implement the coding method according to the invention described in reference to FIG. 1. Each image is divided into blocks of pixels with each of which is associated at least one item of image data. The coding device 12 notably implements a coding with spatial prediction. Only the modules of the coding device 12 relating to the coding by spatial prediction or INTRA coding are shown in FIG. 9. Other modules not shown and known by those skilled in the art of video coders implement the coding temporal prediction (for example motion estimation, motion compensation). The coding device 12 notably comprises a calculation module 1200 able to extract, for example by subtraction pixel by pixel, from a current block B of a prediction block Pr to generate a residue block Bres. The calculation module 1200 is able to implement step 12 of the coding method according to the invention. It further comprises a module 1202 able to transform then quantize the residue block Bres into quantized data. The transform T is for example a discrete cosine transform (or DCT). The coding device 12 further comprises an entropy coding module 1204 able to code the quantized data into a stream S of coded data. It also comprises a module 1206 performing the inverse operation of the module 1202. The module 1206 carries out an inverse quantization $Q^{-1}$ followed by an inverse transformation $T^{-1}$. The module 1206 is connected to a calculation module 1208 capable of merging, for example by addition pixel by pixel, the block of data from the module 1206 and the prediction block Pr to generate a reconstructed block that is stored in a memory 1210.

A prediction module 1216 determines the prediction block Pr. The prediction module 1216 is able to implement step 10 of the coding method according to the invention. Step 14 of the coding method is implemented in the modules 1202 and 1204.

In reference to FIG. 10, the decoding module 13 receives at input a stream S of coded data representative of an image. The stream S is for example transmitted by a coding device 12 via a channel. The decoding device 13 is able to implement the decoding method according to the invention described in reference to FIG. 8. The decoding device 13 comprises an entropy decoding module 1300 able to generate decoded data.

The decoded data are then transmitted to a module 1302 able to carry out an inverse quantization followed by an inverse transform. The module 1302 is identical to the module 1206 of the coding device 12 having generated the stream S. The module 1302 is connected to a calculation module 1304 able to merge, for example by addition pixel by pixel, the block from the module 1302 and a prediction block Pr to generate a reconstructed current block Bc that is stored in a memory 1306. The calculation module 1304 is able to implement step 24 of the decoding method. The decoding device 13 also comprises a prediction module 1308. The prediction module 1308 determines the prediction block Pr. The prediction module 1308 is able to implement step 22 of the decoding method according to the invention. Step 20 of the decoding method is implemented in the modules 1300 and 1302.

Naturally, the invention is not limited to the embodiment examples mentioned above. In particular, those skilled in the art may apply any variant to the stated embodiments and combine them to benefit from their various advantages. Thus, the invention is not limited to the transform type used (for example DCT, wavelet, Discrete Fourier Transform, etc). Likewise, the scanning order of pixels can vary (for example raster scan, zigzag, etc.). Moreover, the invention is in no way limited by the way an energy level is calculated (for example SSE, SAD, Max, etc.).

The invention applies to the coding of fixed images or of image sequences.

The invention claimed is:

1. A method for coding, in a video encoder, a block of pixels, called the current block, comprising:
   determining a prediction pixel for each pixel of said current block,
   extracting from said current block a prediction block formed of said prediction pixels to generate a residue block,
   coding said residue block,
   wherein the determining a prediction pixel for each pixel of said current block comprises:
      applying a first transform on a window covering at least said pixel of said current block to obtain coefficients;
      thresholding the obtained coefficients with a current threshold value; and
      applying an inverse transform of said first transform on said obtained coefficients to obtain said prediction pixel;
   said method for coding further comprising:
   determining, for each reconstructed pixel in a causal neighboring area of the current block, a prediction pixel by thresholding, with a threshold value of a plurality of threshold values, of coefficients resulting from a transformation applied on a window covering at least said reconstructed pixel and by inverse transformation applied to said thresholded coefficients,
   iterating, with each threshold value of said plurality of threshold values, said determining of a prediction pixel for each pixel of said causal neighboring area,
   selecting, from among the plurality of threshold values, a threshold value for which a prediction error calculated between the reconstructed pixels of the causal neighboring area of the current block and the corresponding prediction pixels is the smallest; and
   coding said current threshold value from said selected threshold value.

2. The method according to claim 1, wherein the prediction error calculated between the reconstructed pixels of the causal neighboring area of the current block and the corresponding prediction pixels takes into account, for each of the reconstructed pixels of the casual neighboring area of the current block their distance with respect to the edge of the current block.

3. The method according to claim 1, wherein the size of said window depends on the position in the current block of the pixel to be predicted.

4. A method for decoding, in a video decoder, a current block of pixels, called a current block, comprising:
   decoding a residue block,
   determining, for each pixel of said current block, a prediction pixel,
   reconstructing said current block by merging said decoded residue block and the prediction block formed of said prediction pixels,
   wherein said determining comprises:
      applying a first transform on a window covering at least said pixel of said current block to obtain coefficients;
      thresholding said coefficients with a current threshold value;
      applying an inverse transform of said first transform on said coefficients to obtain said prediction pixel; and
   said method for decoding further comprising:
   determining, for each reconstructed pixel in a causal neighboring area of the current block, a prediction pixel by thresholding, with a threshold value of a plurality of threshold values, of coefficients resulting from a transformation applied on a window covering at least said reconstructed pixel and by inverse transformation applied to said thresholded coefficients,
   iterating, with each threshold value of said plurality of threshold values, said determining of a prediction pixel for each pixel of said causal neighboring area,
   selecting, from among the plurality of threshold values, a threshold value for which a prediction error calculated between the reconstructed pixels of the causal neighboring area of the current block and the corresponding prediction pixels is the smallest; and
   decoding said current threshold value from said selected threshold value.

5. The method according to claim 4, wherein the prediction error calculated between the reconstructed pixels of the causal neighboring area of the current block and the corresponding prediction pixels takes into account, for each of the reconstructed pixels of the causal neighboring area of the current block their distance with respect to the edge of the current block.

6. The method according to claim 4, wherein the size of said window depends on the position in the current block of the pixel to be predicted.

7. An encoder for encoding a current block of pixels comprising at least a processor configured to:
   determine a prediction pixel for each pixel of a current block,
   extract from said current block a prediction block formed of said prediction pixels to generate a residue block,
   code said residue block,
   wherein to determine a prediction pixel for each pixel of said current block, the processor is further configured to:
      apply a first transform on a window covering at least said pixel of said current block to obtain coefficients; and
      threshold said coefficients with a current threshold value;
      apply an inverse transform of said first transform on said coefficients to obtain said prediction pixel;
   wherein said processor is further configured to:
   determine, for each reconstructed pixel in a causal neighboring area of the current block, a prediction pixel by thresholding, with a threshold value of a plurality of threshold values, of coefficients resulting from a transformation applied on a window covering at least said reconstructed pixel and by inverse transformation applied to said thresholded coefficients,
   iterate, with each threshold value of said plurality of threshold values, said determining of a prediction pixel for each pixel of said causal neighboring area,
   select, from among the plurality of threshold values, a threshold value for which a prediction error calculated between the reconstructed pixels of the causal neighboring area of the current block and the corresponding prediction pixels is the smallest; and code said current threshold value from said selected threshold value.

8. The encoder according to claim 7, wherein the prediction error calculated between the reconstructed pixels of the causal neighboring area of the current block and the corresponding prediction pixels takes into account, for each of the reconstructed pixels of the causal neighboring area of the current block their distance with respect to the edge of the current block.

9. The encoder according to claim 7, wherein the size of said window depends on the position in the current block of the pixel to be predicted.

10. A decoder for decoding a current block of pixels, called current block, comprising at least a processor configured to:

decode a residue block, determine, for each pixel of said current block, a prediction pixel, reconstruct said current block by merging said decoded residue block and the prediction block formed of said prediction pixels, wherein to determine, for each pixel of said current block, a prediction pixel, the processor is further configured to:

apply a first transform on a window covering at least said pixel of said current block to obtain coefficients;

threshold said coefficients with a current threshold value;

apply an inverse transform of said first transform on said coefficients to obtain said prediction pixel; and wherein said processor is further configured to:

determine, for each reconstructed pixel in a causal neighboring area of the current block, a prediction pixel by thresholding, with a threshold value of a plurality of threshold values, of coefficients resulting from a transformation applied on a window covering at least said reconstructed pixel and by inverse transformation applied to said thresholded coefficients, iterate, with each threshold value of said plurality of threshold values, said determining of a prediction pixel for each pixel of said causal neighboring area, select, from among the plurality of threshold values, a threshold value for which a prediction error calculated between the reconstructed pixels of the causal neighboring area of the current block and the corresponding prediction pixels is the smallest; and decode said current threshold value from said selected threshold value.

11. The decoder according to claim 10, wherein the prediction error calculated between the reconstructed pixels of the causal neighboring area of the current block and the corresponding prediction pixels takes into account, for each of the reconstructed pixels of the causal neighboring area of the current block their distance with respect to the edge of the current block.

12. The decoder according to claim 10, wherein the size of said window depends on the position in the current block of the pixel to be predicted.

* * * * *